United States Patent [19]

McGuire et al.

[11] Patent Number: 5,407,572

[45] Date of Patent: Apr. 18, 1995

[54] SYSTEMATIC TERTIARY EFFLUENT POLISHING

[75] Inventors: John P. McGuire, Tarrytown; Lirong Li, New City, both of N.Y.

[73] Assignee: Step Three, Inc., Irvington, N.Y.

[21] Appl. No.: 2,881

[22] Filed: Jan. 11, 1993

[51] Int. Cl.⁶ .......................... C02F 1/00; C02F 1/28; C02F 1/26; B01D 36/00
[52] U.S. Cl. ................................ 210/259; 210/201; 210/202; 210/203; 210/252; 210/254; 210/263; 210/295; 210/323.1; 210/502.1; 210/503; 210/756; 210/806; 210/903; 210/906; 210/908; 210/920
[58] Field of Search ............... 210/616, 617, 660, 767, 210/756, 806, 201, 202, 203, 252, 257.1, 259, 254, 263, 323.1, 295, 502.1, 903, 503, 906, 908, 919, 920

[56] References Cited

U.S. PATENT DOCUMENTS

| | | | |
|---|---|---|---|
| 3,733,266 | 5/1973 | Bishop et al. ..................... | 210/903 |
| 4,279,753 | 7/1981 | Nielson et al. .................... | 210/605 |
| 5,236,595 | 8/1993 | Wang et al. ...................... | 210/259 |

FOREIGN PATENT DOCUMENTS

6139877  9/1986  Japan .

OTHER PUBLICATIONS

Yiessman, Warren et al., "Water Supply and Pollution Control," Harper & Row Publishers, New York (1985) pp. 666-689, 712-713.

*Primary Examiner*—Sun Uk Kim
*Attorney, Agent, or Firm*—Ohlandt, Greeley & Ruggiero

[57] ABSTRACT

A tertiary treatment unit is provided that has a first filtration unit operatively connected to an influent for filtering solids therefrom to form an effluent, a second filtration unit operatively connected to the first filtration unit to receive the effluent and to filter finer solids and bacteria and viruses from the effluent, a supply tank operatively connected to the effluent to provide chemicals that are mixed into the effluent, and a reactor that receives the effluent and removes nitrogen and some phosphorous therefrom to form a treated effluent. The treatment unit further has a first adsorption unit that receives the treated effluent and adsorbs additional nitrogen, BOD, TSS and certain chemicals from the treated effluent, and a second adsorption unit that receives the partially adsorbed treated effluent from the first adsorption unit and adsorbs additional phosphorous from the treated effluent to form the final effluent. The final effluent may reduce undesirables to about 2 and about 3 parts per million biochemical oxygen demand (BOD), about 0.1 parts per million total suspended solids (TSS), between about zero and about one part per million of nitrogen, and between about zero and about one-half of one part per million of phosphorous.

1 Claim, 14 Drawing Sheets

AMMONIA NITROGEN & TOTAL PHOSPHORUS REMOVAL STUDY
DATA SUMMARY

| Study Serial No. | 1 | 2 |
|---|---|---|
| Date Performed | March 3 - 5, 1992 | March 5 - 14, 1992 |
| Reactor | ---------- | ---------- |
| Activated Carbon | ---------- | ---------- |
| Alumina | 80 g 8-14 mesh alumina | 80 g. 8-14 mesh alumina |
| Detection Time min. | 4.2 | 10 |
| Influent T.P. mg/l | average 2.0 | average 2.0 |
| Influent Ammonia-N mg/l | ---------- | ---------- |
| Effluent T.P. mg/l | 0 - 0.5 | 0 - 0.5 |
| Effluent Ammonia-N mg/l | ---------- | ---------- |
| T.P. Removal Capacity of Alumina g T.P./100g Alumina | 0.15 | 0.38 |

FIG. 3A

AMMONIA NITROGEN & TOTAL PHOSPHORUS REMOVAL STUDY
DATA SUMMARY

| | |
|---|---|
| Study Serial No. | 3 |
| Date Performed | March 31 - April 23, 1992 |
| Reactor | sand detention time 10 min |
| Activated Carbon | 40 g 0.3-2.0 mm particles |
| Alumina | 80 g 8-14 mesh alumina |
| Detection Time min. | 10 |
| Influent T.P. mg/l | average 2.0 |
| Influent Ammonia-N mg/l | 15 - 22 |
| Effluent T.P. mg/l | 0 - 0.5 |
| Effluent Ammonia-N mg/l | ND (ratio of chlorine/ammonia is 8-9) |
| T.P. Removal Capacity of Alumina g T.P./100g Alumina | 1.04 |

FIG. 3B

AMMONIA NITROGEN & TOTAL PHOSPHORUS REMOVAL STUDY
DATA SUMMARY

| | |
|---|---|
| Study Serial No. | 4 |
| Date Performed | April 27 - June 4, 1992 |
| Reactor | sand detention time 10 min |
| Activated Carbon | 40 g 0.3-2.0 mm particles |
| Alumina | 90 g 28-48 mesh alumina |
| Detection Time min. | 10 |
| Influent T.P. mg/l | average 2.0 |
| Influent Ammonia-N mg/l | 15 - 22 |
| Effluent T.P. mg/l | 0 - 0.5 |
| Effluent Ammonia-N mg/l | ND (ratio of chlorine/ammonia is 8-9) |
| T.P. Removal Capacity of Alumina g T.P./100g Alumina | 1.60 |

FIG. 3C

AMMONIA NITROGEN & TOTAL PHOSPHORUS REMOVAL STUDY
DATA SUMMARY

| | |
|---|---|
| Study Serial No. | 5 |
| Date Performed | June 15 - August 14, 1992 |
| Reactor | sand detention time 10 min |
| Activated Carbon | 40 g 0.3-2.0 mm particles |
| Alumina | 100 g 80-200 mesh alumina |
| Detection Time min. | 10 |

Influent
| | | |
|---|---|---|
| | T.P. mg/l | average 2.0 |
| | Ammonia-N mg/l | 15 - 22 |

Effluent
| | | |
|---|---|---|
| | T.P. mg/l | 0 - 0.5 |
| | Ammonia-N mg/l | ND (ratio of chlorine/ammonia is 8-9) |

| | |
|---|---|
| T.P. Removal Capacity of Alumina g T.P./100g Alumina | 1.51 |

FIG. 3D

AMMONIA NITROGEN & TOTAL PHOSPHORUS REMOVAL STUDY DATA SUMMARY

| | |
|---|---|
| Study Serial No. | 6 |
| Date Performed | Sep. 1 - Oct. 7, 1992 |
| Reactor | sand detention time 10 min |
| Activated Carbon | 40 g 0.3-2.0 mm particles |
| Alumina | 80 g 28-48 mesh alumina |
| Detection Time min. | 10 |
| Influent T.P. mg/l | average 3.38 |
| Influent Ammonia-N mg/l | 10 |
| Effluent T.P. mg/l | 0 - 0.5 |
| Effluent Ammonia-N mg/l | ND (ratio of chlorine/ammonia is 8-9) |
| T.P. Removal Capacity of Alumina g T.P./100g Alumina | 1.04 |

FIG. 3E

AMMONIA NITROGEN & TOTAL PHOSPHORUS REMOVAL STUDY DATA SUMMARY

| | | |
|---|---|---|
| Study Serial No. | | 7 |
| Date Performed | | Sep. 1 - Oct. 1, 1992 |
| Reactor | | ---------- |
| Activated Carbon | | ---------- |
| Alumina | | 80 g 28-48 mesh alumina |
| Detection Time min. | | 10 |
| Influent | T.P. mg/l | average 3.38 |
| | Ammonia-N mg/l | 10 |
| Effluent | T.P. mg/l | 0 - 0.5 |
| | Ammonia-N mg/l | 10 |
| T.P. Removal Capacity of Alumina g T.P./100g Alumina | | 0.88 |

TABLE 1
OPERATING RESULTS - MODE 1

| | Sample location | | | | | | | |
|---|---|---|---|---|---|---|---|---|
| | 1 Influent | | 2 MM Filter | | 3 DE Filter | | 4 GAC Filter | |
| | BOD ppm | TSS ppm | BOD ppm | TSS ppm | BOD ppm | TSS ppm | BOD ppm | TSS ppm |
| Influent | 9.62 | 7.62 | | | | | | |
| Influent | | | 9.62 | 7.62 | | | | |
| Effluent | | | 9.44 | 4.63 | | | | |
| % Removal | | | 1.88 | 39.24 | | | | |
| Influent | | | | | 9.44 | 4.63 | | |
| Effluent | | | | | 8.81 | 2.11 | | |
| % Removal | | | | | 6.67 | 54.43 | | |
| Influent | | | | | | | 8.81 | 2.11 |
| Effluent | | | | | | | 3.19 | 0.58 |
| % Removal | | | | | | | 63.79 | 72.51 |

MODE 1 OVERALL TREATMENT EFFICIENCY

| | BOD | TSS |
|---|---|---|
| Raw Influent | 9.62 | 7.62 |
| Pilot Effluent | 3.19 | 0.58 |
| % Removal | 66.84 | 92.39 |

TABLE 2
OPERATING RESULTS - MODE 2

| | Sample location | | | | | |
|---|---|---|---|---|---|---|
| | 1 Influent | | 2 MM Filter | | 3 GAC Filter | |
| | BOD ppm | TSS ppm | BOD ppm | TSS ppm | BOD ppm | TSS ppm |
| Influent | 6.23 | 6.15 | | | | |
| Influent | | | 6.23 | 6.15 | | |
| Effluent | | | 5.90 | 2.75 | | |
| % Removal | | | 5.30 | 55.28 | | |
| Influent | | | | | 5.90 | 2.75 |
| Effluent | | | | | 3.05 | 1.15 |
| % Removal | | | | | 48.31 | 58.18 |

MODE 2 OVERALL TREATMENT EFFICIENCY

| | BOD | TSS |
|---|---|---|
| Raw Influent | 6.23 | 6.15 |
| Pilot Effluent | 3.05 | 1.15 |
| % Removal | 51.04 | 81.30 |

FIG. 7A

TABLE 3
OPERATING RESULTS - MODE 3

| | Sample location | | | | | | | |
|---|---|---|---|---|---|---|---|---|
| | 1<br>Influent | | 2<br>MM Filter | | 3<br>DE + DE Filter | | 4<br>GAC Filter | |
| | BOD<br>ppm | TSS<br>ppm | BOD<br>ppm | TSS<br>ppm | BOD<br>ppm | TSS<br>ppm | BOD<br>ppm | TSS<br>ppm |
| Influent | 8.52 | 5.88 | | | | | | |
| Influent | | | 8.52 | 5.88 | | | | |
| Effluent | | | 7.08 | 3.08 | | | | |
| % Removal | | | 16.90 | 47.62 | | | | |
| Influent | | | | | 7.08 | 3.08 | | |
| Effluent | | | | | 7.08 | 1.15 | | |
| % Removal | | | | | 0.00 | 62.66 | | |
| Influent | | | | | | | 7.08 | 1.15 |
| Effluent | | | | | | | 1.88 | 1.15 |
| % Removal | | | | | | | 73.45 | 0.00 |

MODE 3 DE + DE TREATMENT EFFICIENCY

| | BOD | TSS |
|---|---|---|
| Raw Influent | 8.52 | 5.88 |
| DE + DE Effluent | 7.08 | 1.15 |
| % Removal | 16.90 | 80.44 |

MODE 3 OVERALL TREATMENT EFFICIENCY

| | | |
|---|---|---|
| | 77.93 | 80.44 |

FIG. 7B

TABLE 4
OPERATING RESULTS - MODE 4

| | Sample location | | | | | | | |
|---|---|---|---|---|---|---|---|---|
| | 1 | | 2 MM Filter | | 3 DE + DE Filter | | 4 GAC+GAC Filter | |
| | BOD ppm | TSS ppm | BOD ppm | TSS ppm | BOD ppm | TSS ppm | BOD ppm | TSS ppm |
| Influent | 8.90 | 7.21 | | | | | | |
| Influent | | | 8.90 | 7.21 | | | | |
| Effluent | | | 7.70 | 3.00 | | | | |
| % Removal | | | 13.48 | 58.39 | | | | |
| Influent | | | | | 7.70 | 3.00 | | |
| Effluent | | | | | 6.26 | 0.36 | | |
| % Removal | | | | | 18.70 | 88.00 | | |
| Influent | | | | | | | 6.26 | 0.36 |
| Effluent | | | | | | | 2.17 | 0.36 |
| % Removal | | | | | | | 65.34 | 0.00 |

MODE 4 OVERALL TREATMENT EFFICIENCY

| | BOD | TSS |
|---|---|---|
| Raw Influent | 8.90 | 7.21 |
| Pilot Effluent | 2.17 | 0.36 |
| % Removal | 75.62 | 95.01 |

MM means mixed media filter
DE means diatomaceous earth filter
GAC means granulated activated carbon

TABLE 5
BOD REMOVAL EFFICIENCY

| Mode of Operation | System Process | BOD5 Removal Efficiency |
|---|---|---|
| 1 | MM+DE+GAC | 63.8% |
| 2 | MM+GAC | 48.3% |
| 3 | MM+DE+DE+GAC | 73.4% |
| 4 | MM+DE+DE+GAC+GAC | 65.3% |

FIG. 7C

SYSTEMATIC TERTIARY EFFLUENT POLISHING

The present invention relates generally to removing contaminants from an influent, such as wastewater or water. More particularly, it relates to a systematic tertiary treatment process (step) for such influents that results in an effluent that has much lower levels of contaminants, such as biochemical oxygen demand (BOD), total suspended solids (TSS), nitrogen and phosphorous than achieved in any known prior art tertiary treatment process.

In addition, the systematic treatment process has been found to have three subprocesses and units. One subprocess is used to reduce BOD and TSS, the second subprocess is used to reduce BOD, TSS and nitrogen, and the third subprocess is used to reduce BOD, TSS and phosphorous.

The present systematic treatment process and its subprocesses are flexible enough to adapt to existing wastewater and water treatment facilities, and can be modified in order to achieve desired purposes, such as removal of BOD and TSS, or removal of BOD, TSS, nitrogen, phosphorous, bacteria and viruses.

BACKGROUND OF THE INVENTION

Reducing the undesirable solids and analytes in raw wastewater has been tried for a number of years. The raw wastewater or influent would enter a primary treatment facility to remove the large particle contaminants in the raw wastewater. The primary treated wastewater would then be sent to a secondary treatment facility in order to lower the total suspended solids (TSS) and reduce the biochemical oxygen demand (BOD) in that wastewater. In the primary and the secondary treatments, nitrogen and phosphorous are coincidentially reduced.

However, eutrophication caused by nitrogen and phosphorous has resulted in serious environmental degradation of many lakes, rivers and even large bodies of water, such as, for example, the Long Island sound. The known secondary treatment facilities, except when needed for microbiological metabolism, do not normally direct themselves to the reduction of nitrogen (N) and phosphorous (P).

More recently, a tertiary treatment or third treatment step that employs physical-chemical or biological process followed by chemical precipitation has been used to lower the concentration of these analytes. To remove the nitrogen and phosphorous in the known tertiary treatment processes has been found costly. The tertiary treatment processing units have also been found to require a significant area in a facility.

The present tertiary process increases the amount of TSS, BOD, and the analytes nitrogen and phosphorous, removed from influent over known tertiary treatment units and processes. The present tertiary treatment process can also remove bacteria and viruses much more effectively than present systems.

The present treatment unit can be used as a wastewater enhanced treatment, drinking water treatment, industrial wastewater enhanced treatment, and in-lake revitalization. It is versatile and requires a very small area as compared to the prior art treatment units. It is adaptable and can fit existing plant operations, as well as complying with present government regulatory or permit requirements.

The prior art treatment units fail to provide the combination of treatment units or stations provided in the present treatment unit. Furthermore, the precise steps of the present treatment process are absent in the prior art processes.

For example, some prior art units and processes provide breakpoint chlorination or superchlorination that is accomplished by the addition of chlorine to the effluent or wastewater stream in an amount sufficient to oxidize the ammonia-nitrogen to nitrogen gas. After sufficient chlorine is added to oxidize the organic matter and other readily oxidizable substances present, a stepwise reaction of the chlorine with ammonium takes place. Such breakpoint chlorination is shown in U.S. Pat. No. 3,733,266 titled: Waste Water Purification By Breakpoint Chlorination and Carbon Adsorption, which issued on May 15, 1973 to D.F. Bishop, et al. This patent is directed to a method of purification of wastewater in which sodium hypochlorite or chlorine is used to oxidize the ammonia in raw, secondary lime clarified wastewaters using breakpoint chlorination. The sodium hypochlorite or chlorine is added to the influent and mixed therein by a mixer-reactor, then the influent, now effluent, passes a carbon adsorption station or step to provide the resultant effluent.

U.S. Pat. No. 3,760,829 titled: Automatic Control System For The Safe and Economical Removal of NH3 by Breakpoint Chlorination, which issued on Sep. 25, 1973 to W.W. Schuk, et al., is directed to an automatic system for controlling the chlorine feed in a breakpoint chlorination process. See also, U.S. Pat. No. 4,435,291 titled: Breakpoint Chlorination Control System, which issued on Mar. 6, 1984 to T.N. Matsko.

U.S. Pat. No. 4,948,510 titled: Biological Phosphorous Removal From Wastewater Using Multiple Recombinable Basins, which issued on Aug. 14, 1990 to M.D. Todd, et al., is directed to a process for removing phosphorous, as well as lowering the amounts of ammonia, TSS and BOD levels. The treatment cycle of this process provides multiple basins that may be individually controlled to achieve anaerobic, anoxic or aerobic conditions to optimize the growth of phosphorous storing microorganisms, and thus cause the uptake of phosphorous by the organisms and also provide for the microbiological nitrification of ammonia.

U.S. Pat. No. 4,366,064 titled: Treatment of Blast Furnace Wastewater to Mihelic, et al., is directed to a method used to treat blast furnace and other wastewater containing ammonia, cyanide and phenol by a breakpoint chlorination. An activated carbon step is provided to remove residual contaminants.

Japanese citation No. 61-39877 provides a method for treating phosphate-containing water by placing the water in contact with calcium phosphate-containing seed crystal and with activated alumina.

Thus, the prior art fails to address the combined removal of BOD, TSS, nitrogen and phosphorous in a single system. The prior art also fails to provide the combination and sequence of operations in the treatment unit and steps in the present systematic tertiary treatment process. In addition, the prior art fails to provide the versatility of the subprocesses of the present process.

Against the foregoing background, it is a primary object of the present invention to provide a treatment system or unit and process that reduces in influent the levels of TSS, BOD, nitrogen, phosphorous, bacteria and viruses.

The preferred treatment unit and process is a systematic tertiary treatment unit and process that also removes bacteria and viruses.

The present invention provides a tertiary treatment unit and process that are versatile.

The present invention further provides a tertiary treatment system or unit that requires a relatively small area, and is adaptable so that it can readily fit into existing plants.

An alternative embodiment of the present invention is a tertiary treatment unit and process therefore to remove TSS and BOD from an influent which unit and process include two filtration units and an adsorption unit.

Another alternative embodiment of the present invention is a tertiary treatment unit and process therefore to remove TSS, BOD and nitrogen from an influent which unit and process include two filtration units, means for supplying chemicals, an in-line mixer for mixing the chemicals into the effluent in the unit, a reactor and an adsorption unit.

SUMMARY OF THE INVENTION

To the accomplishments of the foregoing objects and advantages, the present invention, in brief summary, comprises a treatment unit, preferably a tertiary treatment unit, that includes first filtration means operatively connected to an influent stream for filtering solids therefrom to form an effluent, second filtration means operatively connected to said first filtration means to receive the effluent and to filter finer solids and bacteria and viruses from the effluent, supply means operatively connected to the effluent to provide chemicals that are mixed into the effluent, and a reactor that receives the effluent and removes nitrogen and some phosphorous therefrom to form a treated effluent. The treatment unit further has first adsorption means that receives the treated effluent and adsorbs additional nitrogen, BOD and TSS and certain chemicals from the treated effluent, and second adsorption means that receives the treated effluent from said first adsorption means and adsorbs additional phosphorous from the treated effluent to form the finally treated effluent. The finally treated effluent achieves between about 2 and about 3 parts per million BOD, about 0.1 parts per million TSS, between about zero and about one part per million of nitrogen, and between about zero and about one-half of one part per million of phosphorous.

A first alternative embodiment of the present invention is a tertiary treatment system or unit that removes TSS and BOD from an influent which system comprises first filtration means operatively connected to an influent stream for filtering solids therefrom to form an effluent, second filtration means operatively connected to said first filtration means to receive the effluent and to filter finer solids, bacteria and viruses, and first adsorption means that receives the treated effluent and adsorbs additional BOD and TSS from the treated effluent to form the finally treated effluent.

A second alternative embodiment of the present invention is a tertiary treatment system or unit that removes TSS, BOD and nitrogen from an influent which unit comprises first filtration means operatively connected to an influent stream for filtering solids therefrom to form an effluent, second filtration means operatively connected to said first filtration means to receive the effluent and to filter finer solids, bacteria and viruses, supply means operatively connected to the effluent to provide chemicals that are mixed into the effluent, and a reactor that receives the effluent and removes nitrogen therefrom to form a treated effluent. The treatment system further comprises adsorption means that receives the treated effluent and adsorbs additional nitrogen, BOD and TSS and certain chemicals from the treated effluent to form the finally treated effluent.

A third alternative embodiment of the present invention is a tertiary treatment system or unit that removes TSS, BOD and phosphorous from an influent which unit comprises first filtration means operatively connected to an influent stream for filtering solids therefrom to form an effluent, second filtration means operatively connected to said first filtration means to receive the effluent and to filter finer solids, first adsorption means that receives the effluent and adsorbs additional BOD and TSS and certain chemicals, and a second adsorption that receives the effluent from said first adsorption means and adsorbs phosphorous to form the finally treated effluent.

The foregoing and still other objects and advantages of the present invention will be more apparent from the following detailed explanation of the preferred embodiments of the invention in connection with the accompanying drawings wherein:

BRIEF DESCRIPTION OF THE PREFERRED EMBODIMENTS

Figure 1:
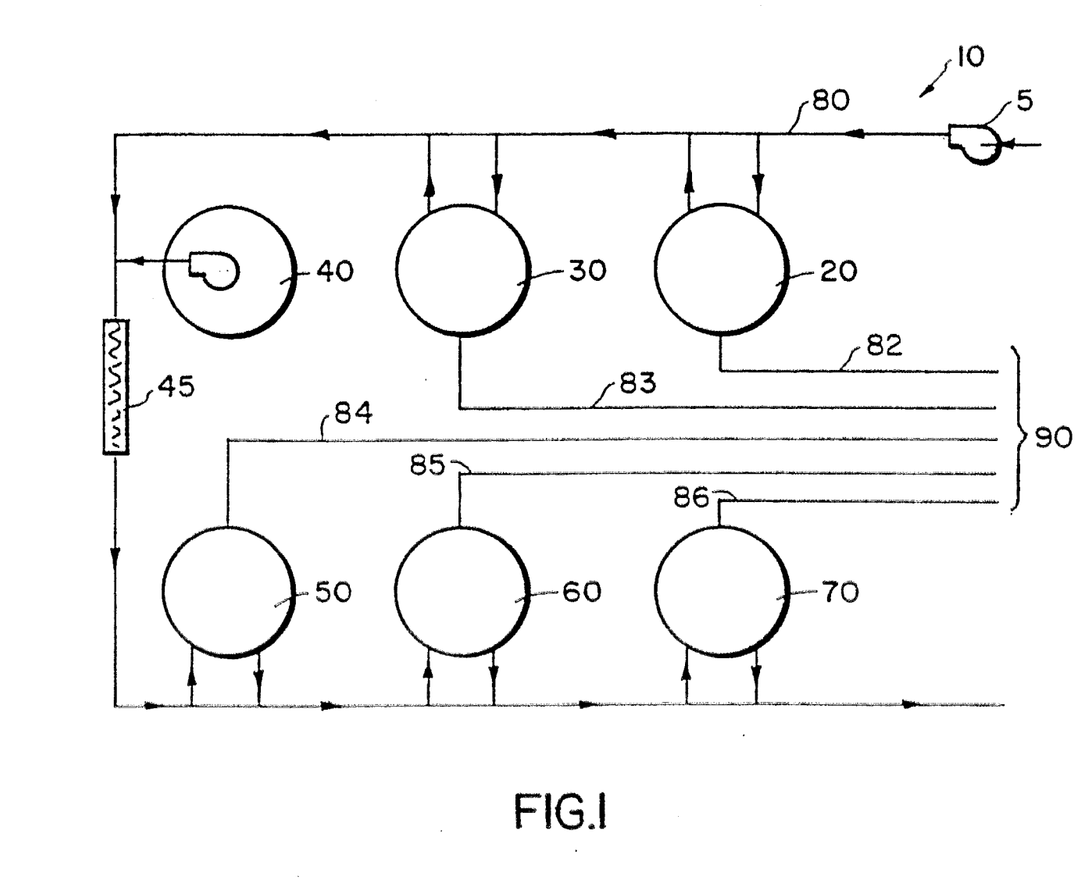
FIG. 1 is a schematic view of a systematic tertiary treatment process of the present invention.

Referring to the figures and, in particular, FIG. 1, there is provided a tertiary treatment system or unit generally represented by reference numeral 10. The system 10 includes a first filter or filtration unit 20, a second filter or filtration unit 30, a supply tank 40, a reactor 50, a first adsorption unit or tank 60, and a second adsorption unit or tank 70, as the main components. Pipes or tubes, as will be discussed below, operatively connect the main components. The pipes have provisions so that each of the above components can be by-passed for maintenance, backwashing, recharging or replacing.

The main components, except the supply tank 40, are operatively connected to backwash and unit process drains represented by reference numeral 90.

The system 10 receives influent wastewater from a supply pump 5 connected to a secondary treatment plant. The influent is connected by the pipe 80 from the pump 5 to the first filtration unit 20.

The first filtration unit 20 can be of any conventional material that removes coarse solids from secondary treatment effluents. Preferably, the first filtration unit 20 is either a mixed media filter or filtration sand. The influent is treated at the first filtration unit 20 to remove coarse solids from the flow stream. The first filtration unit 20 is connected via pipe 82 to a backwash. The backwash from the first filtration step is directed back to the head of the treatment plant.

The filtered effluent that emits from the first filtration unit 20 then proceeds through pipe 80 to the second filtration unit 30. The second filtration unit 30 removes finer solids, e.g. it filters TSS and BOD, and bacteria and viruses from the effluent. The second filtration unit 30 includes diatomaceous earth alone as the preferred filter medium. However, the filter medium can include fly ash, powdered activated carbon, clay or any mixture thereof mixed with diatomaceous earth. The fly ash and the powder activated carbon are known adsorbers and therefore are mixed with diatomaceous earth when improved adsorption is desired. Clay is a known ion exchange medium and, therefore, is mixed with diatomaceous earth when the ability to remove dissolved metals is desired.

The wash and drain from the second filtration unit 30 moves via pipe 83 to station 90. The second filtration media is renewed by conventional means to slough off the media from the internal support system. Such conventional means are pure mechanical, auto mechanical, hydraulic, pneumatic or any combination thereof. Returning flow back into the second filtration unit hydraulically redeposits the second filtration media back on the supports in the filtration unit. Accordingly, the second filtration media is capable of trapping additional solids over several regeneration cycles before it must be replaced. The second filtration media that is spent can be disposed of along with other process sludges in a digestion or thickening or dewatering process.

Thus, the two filtration units 20, 30 remove successively finer solids from the flow stream. The two filtrations units or steps remove solids from the effluent and, in addition, protect the remaining process steps from premature blinding.

The filtered effluent is then moved by pipe 80 through mixer 45 to the reactor 50. Along pipe 80, the supply tank 40 is equipped with a chemical feed pump that provides a chemical, such as chlorine, sodium hypochlorite or calcium hypochlorite, into the treated effluent. The preferred chemical is calcium hypochlorite. The chemical feed pump actually forces a chemical into the filtered effluent. The effluent is then moved to a mixer, most preferably an in-line mixer 45. The mixer 45 is a static mixer that mixes the chemical into the filtered effluent. An in-line mixer 45 provides improved efficacy since it avoids loss of chemicals and provides direct mixing of the chemicals in the effluent.

The mixed, filtered effluent is then forwarded via pipe 80 to the reactor 50. The reactor 50 removes a significant portion of the nitrogen from the influent and precipitates part of the phosphorous which is then removed in the backwash. The removed precipitates are sent via pipe 84 to its backwash 90.

The combination of supplying the calcium hypochlorite from the supply tank 40, the mixing of the calcium hypochloride by the mixer 45 and the reaction caused in reactor 50 results in the oxidization of ammonia-nitrogen in the effluent to nitrogen gas.

The effluent is then forwarded via pipe 80 to the first adsorption unit 60. The first adsorption unit 60 includes granulated activated carbon as the adsorption medium. It adsorbs from the effluent some additional nitrogen, additional BOD and TSS, and some other chemicals including any residual chlorine compounds.

The effluent is then forwarded via pipe 80 to the second adsorption unit 70. The second adsorption unit 70 has activated alumina as its adsorption medium. However, alumina can also be used. The second adsorption unit 70 adsorbs additional phosphorous.

The vessels for the reactor 50, the first adsorption unit 60 and the second adsorption unit 70 each require backwashing. The backwash from the first adsorption unit 60 and the second adsorption unit 70 is directed by pipes 85 and 86, respectively, back to the backwash and unit process drains 90 and then to the treatment influent.

It is believed that backwashing in the various units will vary. For example, the first filtration unit 20 will need to be backwashed the most of all units, perhaps daily in normal use. The second filtration unit 30 will need to be renewed periodically. The filtration media will probably need to be replaced once a week in normal use. The reactor 50 will need to be backwashed less than the first filtration unit 20, while the first adsorption unit will need to be backwashed less than the reactor. The second adsorption unit 70 will need to be backwashed the least, i.e. less than the first adsorption unit 60.

The ultimate tertiary treatment unit and process is directed to the total or almost total removal of nitrogen and phosphorous BOD, TSS, bacteria and viruses. This ultimate tertiary treatment unit and process includes the first and second filtration, the chemical supply, the reactor and the first and second adsorption units and steps.

Domestic wastewater normally has the following typical characteristics in parts per million (ppm) which equals one milligram per liter (mg/L) when it is a raw influent, after primary treatment, e.g. a primary treatment effluent, and a second treatment effluent:

| Analyte | Raw Influent | Primary Treatment Effluent | Secondary Treatment Effluent |
| --- | --- | --- | --- |
| BOD | 250 ppm | 175 ppm | 25 ppm |
| TSS | 250 ppm | 100 ppm | 25 ppm |
| nitrogen | 40 ppm | 35 ppm | 25 ppm |
| phosphorous | 10 ppm | 8 ppm | 5 ppm |

The prior art tertiary treatment processes and units have achieved the following values from the secondary treatment effluent again measured in parts per million (ppm) which equals one milligram per liter (mg/L):

| Analyte | Secondary Treatment Effluent | Tertiary Treatment Effluent |
| --- | --- | --- |
| BOD | 25 ppm | 5 ppm |
| TSS | 25 ppm | 5 ppm |
| nitrogen | 25 ppm | 3 ppm |
| phosphorous | 5 ppm | 1 ppm |

The present tertiary treatment unit and process, that also uses secondary treated effluent as its influent or flow source, results in the following treated or final effluent:

| Analyte | Secondary Treatment Effluent (Influent) | STEP Tertiary Treatment Effluent |
| --- | --- | --- |
| BOD | 25 ppm | 2 to 3 ppm |
| TSS | 25 ppm | 0.1 ppm |
| nitrogen | 25 ppm | 0 to 1.0 ppm |

| Analyte | Secondary Treatment Effluent (Influent) | STEP Tertiary Treatment Effluent |
| --- | --- | --- |
| phosphorous | 5 ppm | 0 to 0.5 ppm |

The treatment process operates under pressure. Preferably, it operates at approximately under 30 psi pressure. The resultant or finally treated effluent looks and smells like drinking water. The finally treated effluent will meet present and anticipated future regulatory or government regulations.

Figure 2:
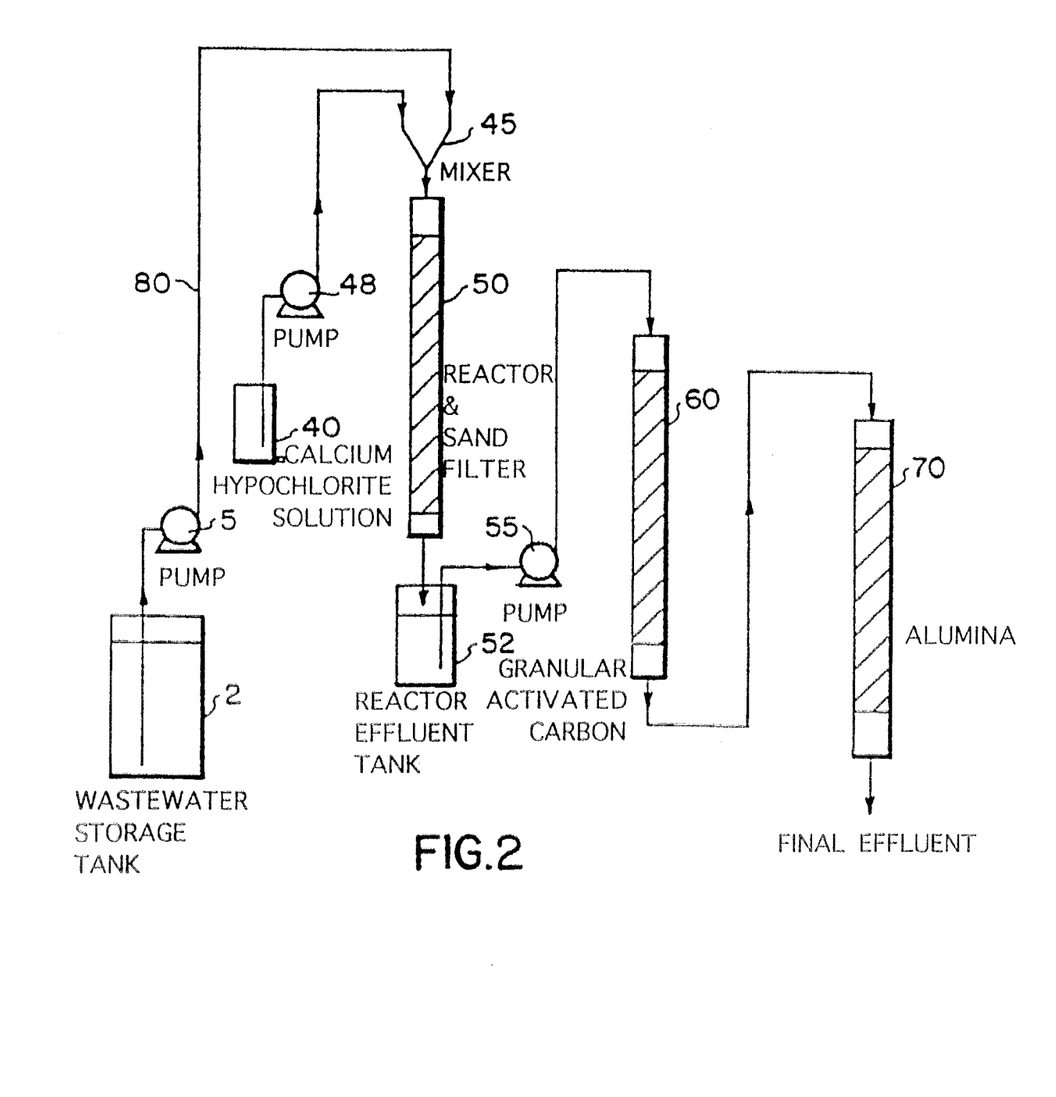
FIG. 2 is a schematic view of a systematic bench scale tertiary treatment unit of the present invention.
Figure 3A:
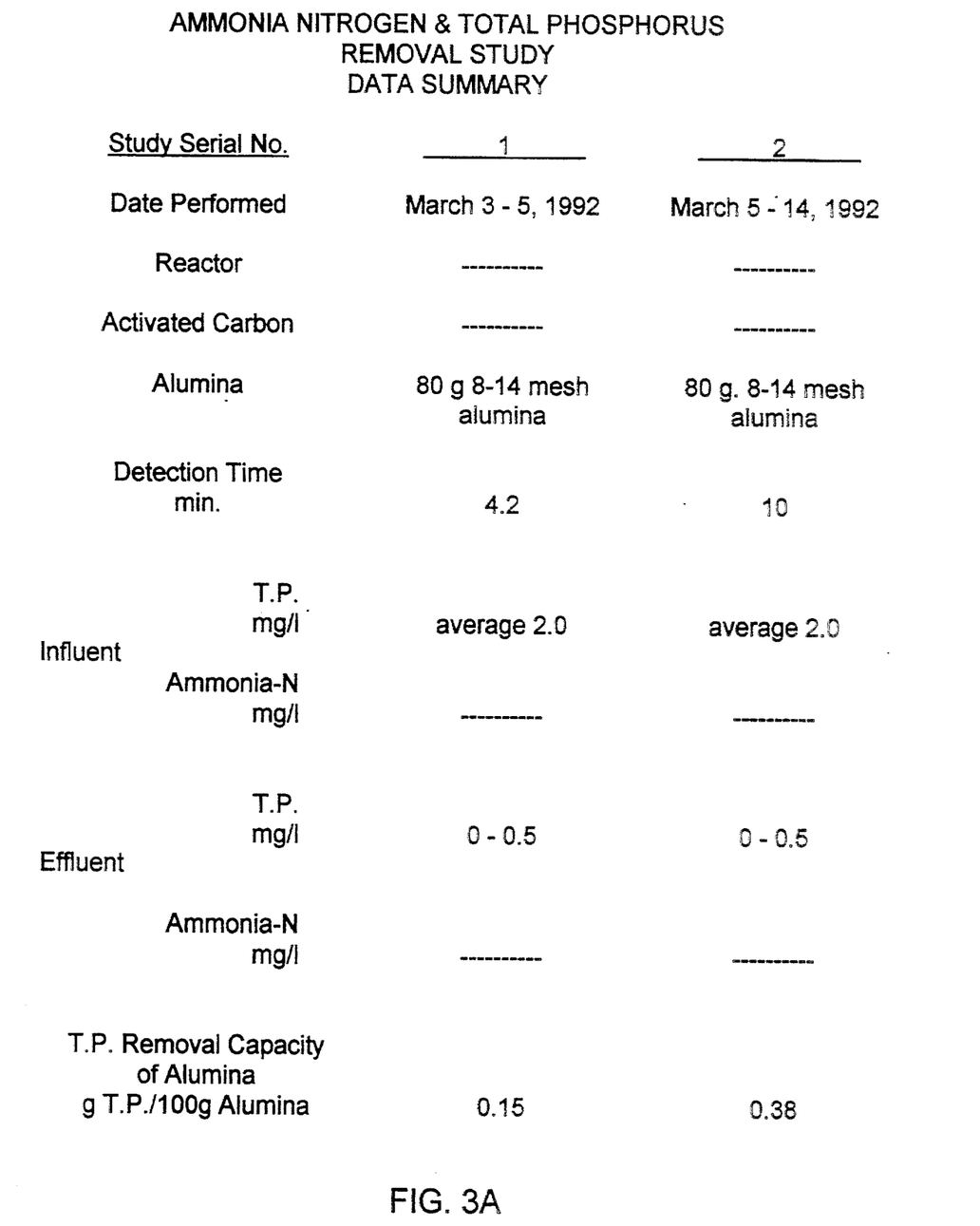
FIGS. 3A through 3F are charts of the data summary of a study of the unit of FIG. 2.
Figure 3B:
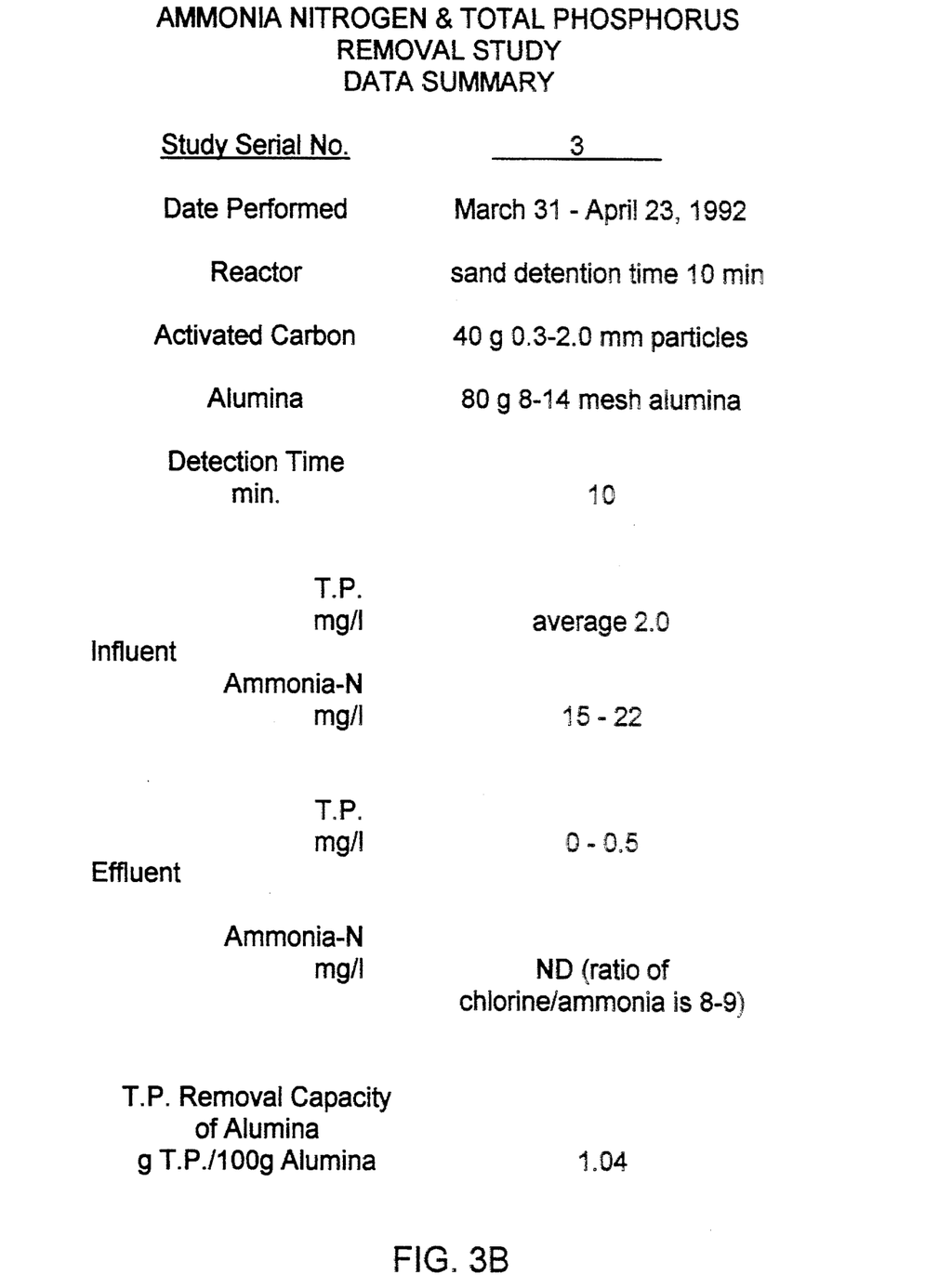
Figure 3C:
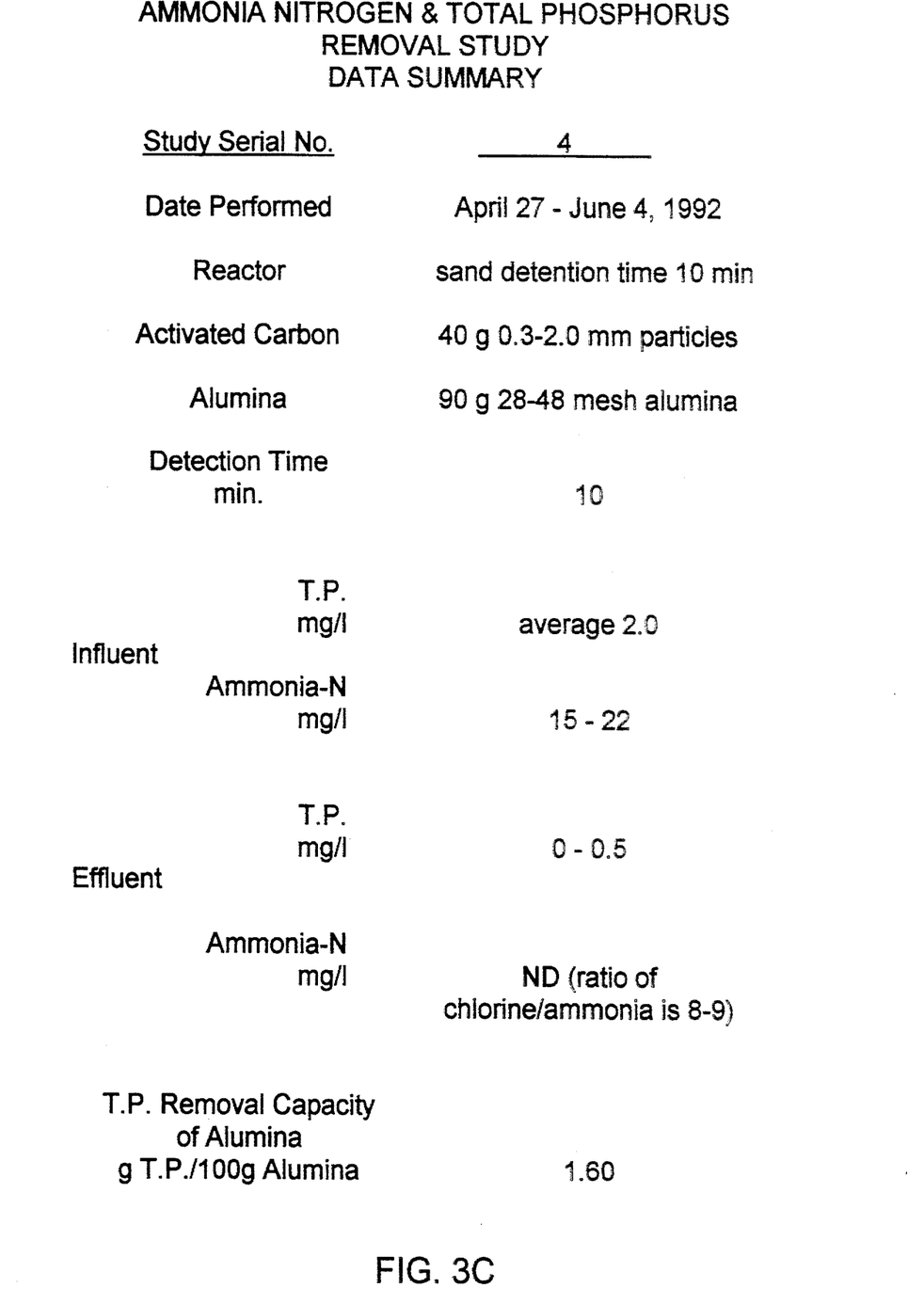
Figure 3D:
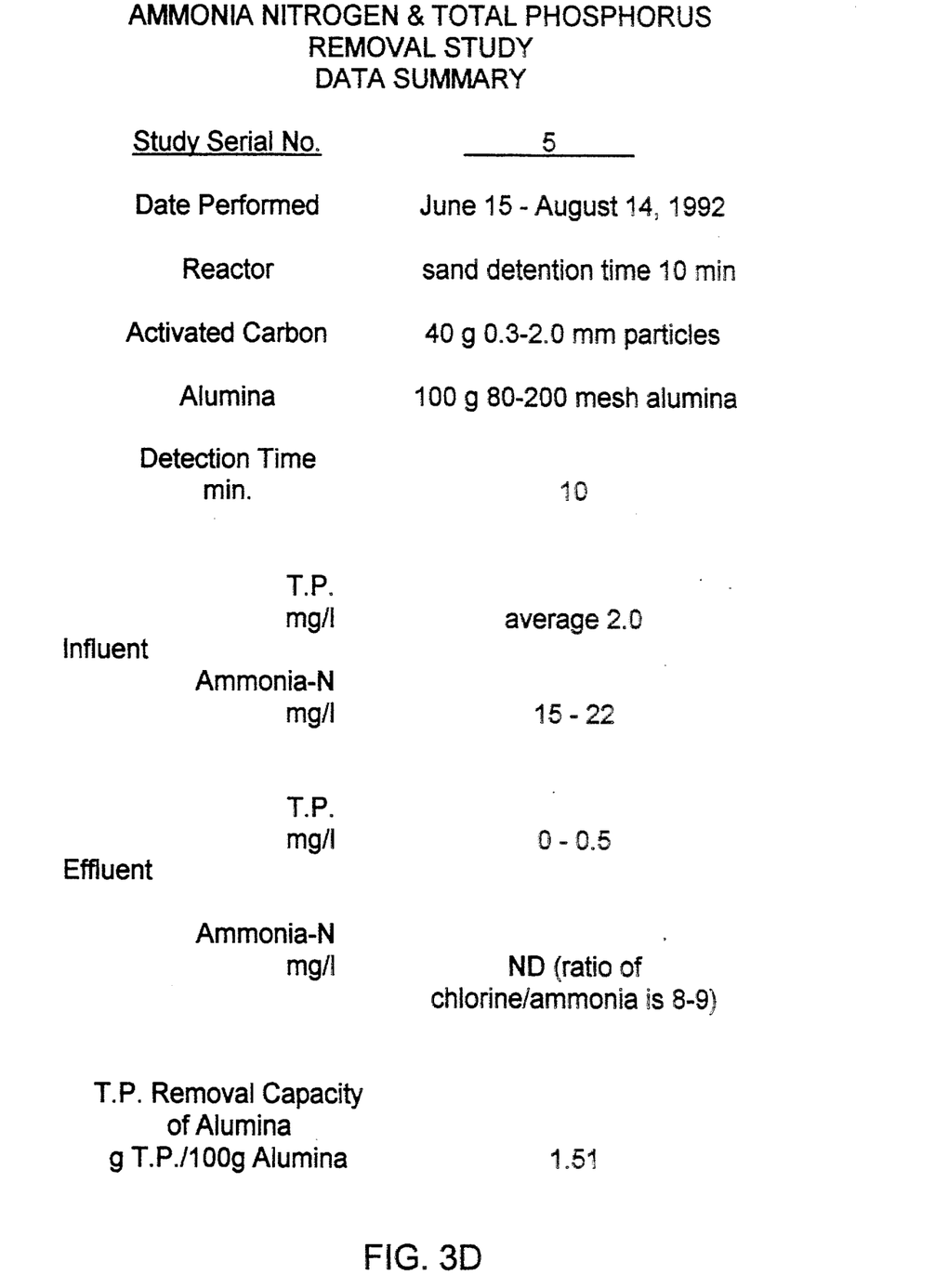
Figure 3E:
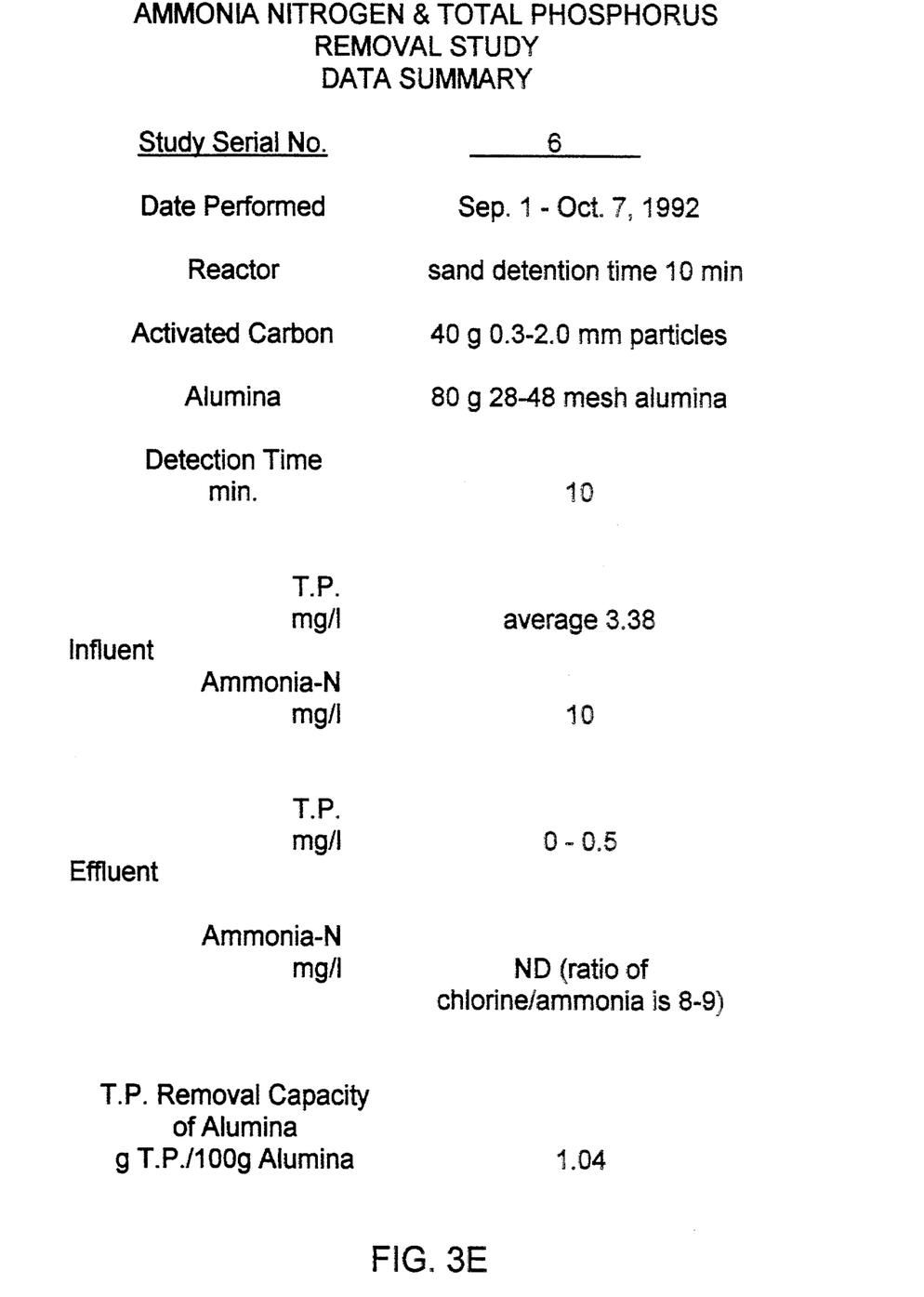
Figure 3F:
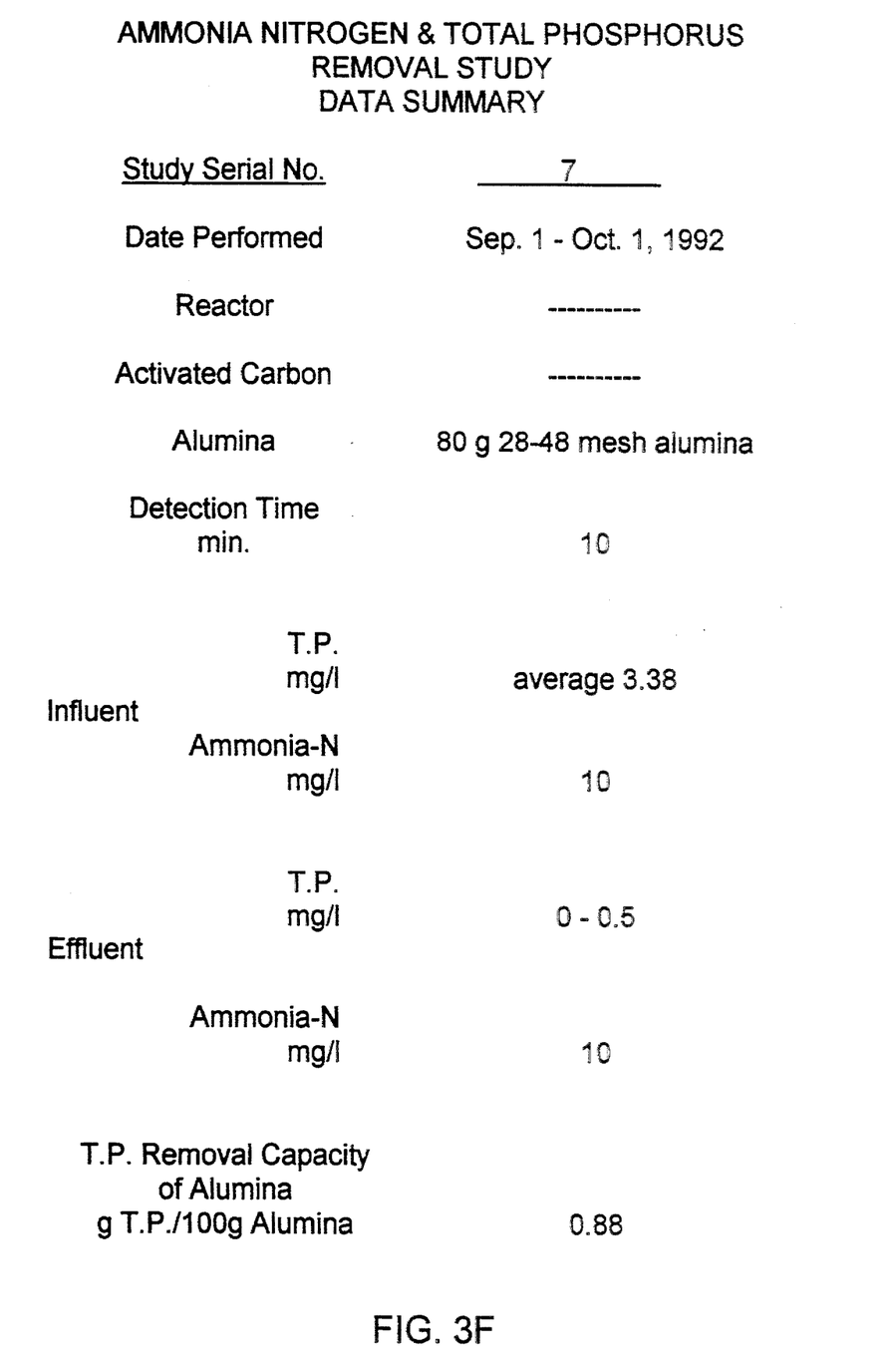

The treatment process set forth in FIGS. 1 and 2 is much more economical than any other tertiary treatment process since it minimizes space and components needed while achieving maximum removal of TSS, BOD, phosphorous and nitrogen which, heretofore, had not been considered in one treatment process.

FIG. 2 is a schematic of an actual pilot plant operation of the full systematic tertiary treatment process of the present invention that was performed earlier this year. A wastewater storage tank 2 is connected to the supply pump 5 that, as described in FIG. 1, provides wastewater influent through pipe 80 to the treatment unit 10. The influent passes through the twin filtration units (not shown) and is moved to the in-line mixer 45 while calcium hypochlorite is pumped by pump 48 from the supply unit 40 also to the in-line mixer. From the in-line mixer 45, the effluent passes to the reactor 50 and then to a reactor effluent tank 52 and via pump 55 is forwarded to the first adsorption unit 60. The first adsorption unit 60 has granular activated carbon as the first adsorption medium. The effluent is then forwarded to the second adsorption unit 70 that has alumina as the second adsorption medium. The laboratory results of this pilot plant operation are set forth in FIGS. 3A through 3F.

The versatility of the present treatment system and process allows for installation of separate steps in order to attain different effluent requirements. The resultant effluent has a combination of low levels of BOD, TSS, nitrogen and phosphorous, that have not, heretofore, been found in other tertiary treatment processes. In addition, the present tertiary treatment process removes bacteria and viruses from the effluent.

Figure 4:
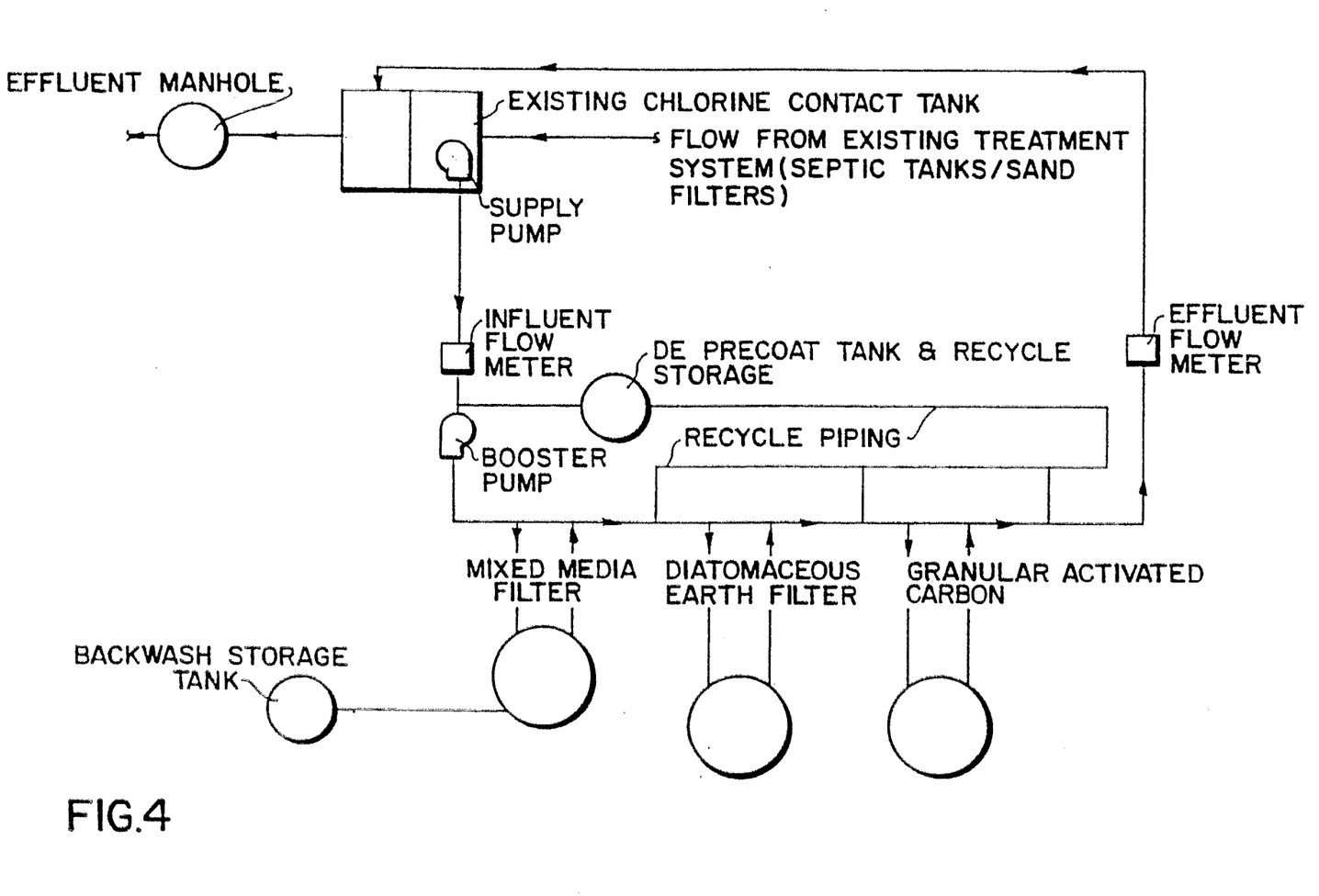
FIGS. 4 through 6 are schematic layouts of test units of the first alternative process of the present invention.
Figure 5:
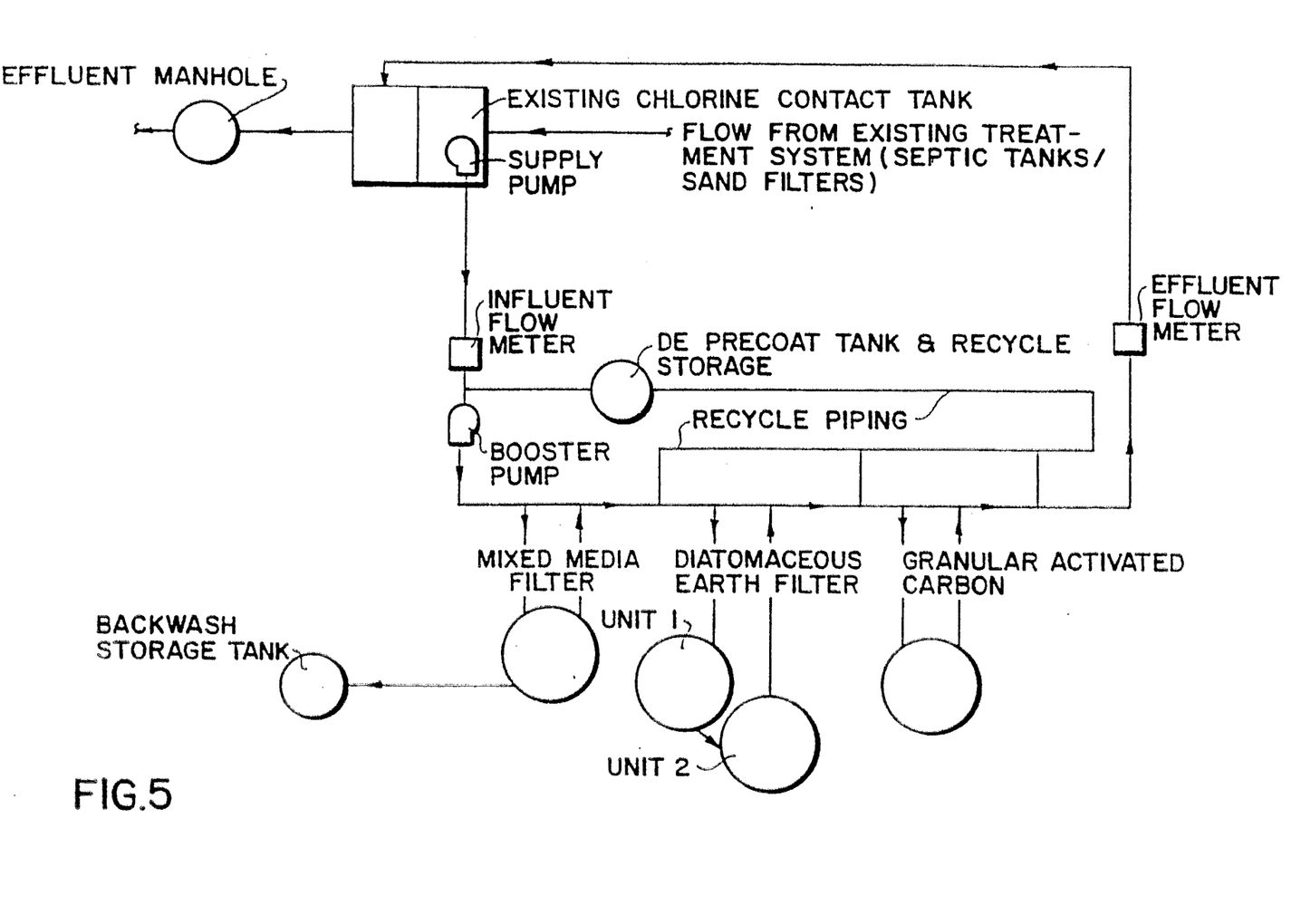
Figure 6:
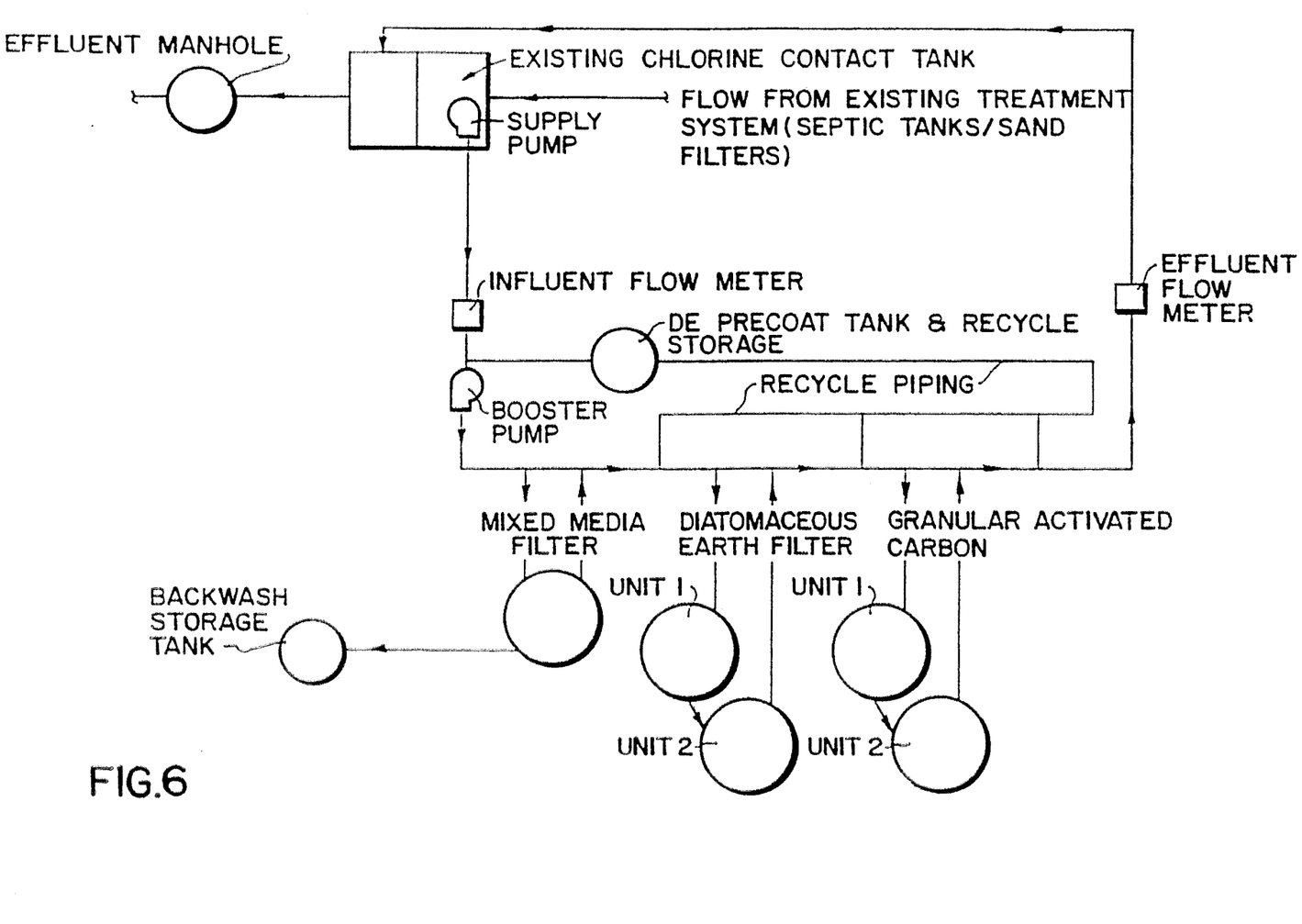

A first alternative embodiment of the present process is shown in FIGS. 4 through 6. These figures illustrate the schematic layout of pilot plant systems that were placed in experimental use from Oct. 15, 1991 through Jan. 15, 1992. The goal of these pilot plant systems was to provide granular activated carbon (GAC) as an absorption/adsorption system to function as a polishing filter after twin filtration, but prior to chlorination. The first filtration unit had mixed media (MM) as the filtration medium, while the second filtration unit had diatomaceous earth (DE) as the second filtration medium. The first and second filtration mediums were installed lapstream of the adsorption unit. They prevented premature plugging and also removed TSS from the flow stream before it advanced to the adsorption unit. DE filtration removes particulates down to microbe size.

MM was comprised of 50 lbs. of high rate sand No. ½ (0.45 mm–0.55 mm) and approximately 35 lbs of anthracite (0.9 mm–1.1 mm, 1.4 UC). The surface area of the filter was 1.4 sq.ft. and the design surface loading rate using clean water was 25 gpm/sq.ft. DE filter was 72 individual tube assemblies that had a surface area of 11.8 sq.ft., and a design surface loading rate of 4.23 gpm/sq.ft. when operating with clean water. The GAC had a recommended maximum flow rate of 10 gpm and the detention time at that flow was five and one-half minutes. The loading rates for the treatment units were:

| Treatment Unit | Loading Rate with Clean Water | Applied Loading with Treated Effluent |
| --- | --- | --- |
| MM | 25 gpm/sq.ft. | 3.5 gpm/sq.ft. |
| DE | 4.23 gpm/sq.ft. | 0.423 gpm/sq.ft. |

| | Detention Time | |
| --- | --- | --- |
| | at 10 gpm | at 5 gpm |
| GAC | 5½ min. | 11 min. |

The typical operating pressures were in the range of 30 psi for treated effluent vs 6 to 12 psi for clean water.

The carbon drum used in the experimental pilot system contained 200 lbs. of activated carbon. The BOD adsorption capacity of the carbon is 25% of its weight so that the carbon could remove 50 lbs. of BOD before it is spent.

Figure 7A:
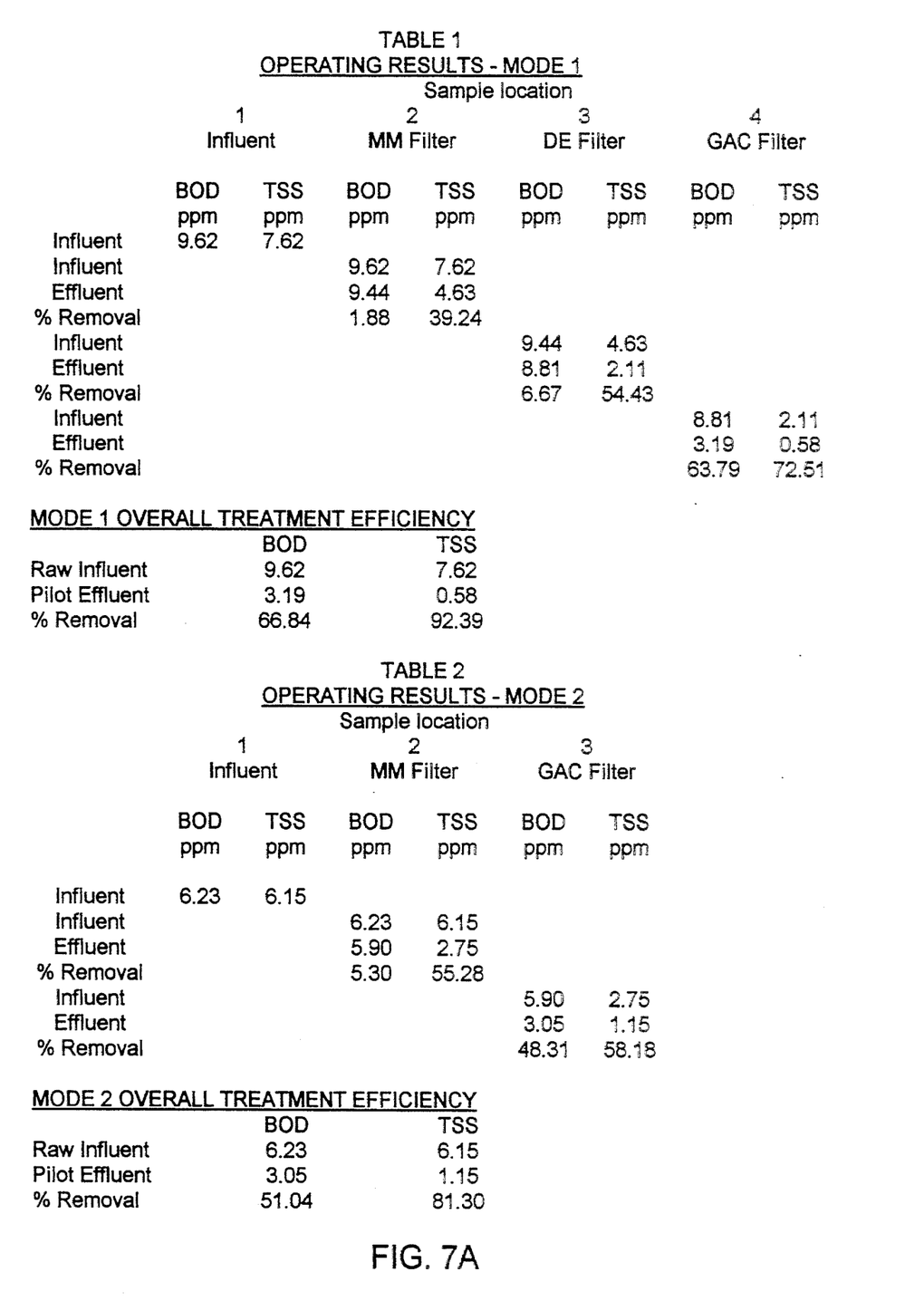
FIGS. 7A through 7C are Tables summarizing the results of the test units shown in FIGS. 4 through 6.

FIG. 4 is a schematic of the first and second operating modes of the pilot plant system. This first operating mode includes a MM filter, a DE filter and a GAC filter or absorption medium. The results are set forth in Table 1 in FIG. 7A. The results demonstrated overall removal efficiencies of 66.8% and 92.4% of BOD and TSS, respectively. The removal of TSS through MM and DE filters is very effective, namely 72%, however BOD removal through the same filters is only 8.4%. When the flow reaches the GAC, BOD removal occurs at 63.8%. The deep bed of GAC further reduced TSS by 72% of that applied.

The second operating mode includes the MM filter followed by the GAC filter. The results of the second operating mode are set forth in Table 2 also in FIG. 7A. The MM filter alone achieved 55% removal of the TSS applied. However, mode 2 used different and more frequent cleaning and backwashing so that the higher TSS removal demonstrated the effectiveness of frequent backwashing. Operating mode 2 also demonstrated that the majority of the BOD removal took place in the GAC filter or unit, and that operating without the DE filter reduced the level of TSS and BOD removals by about 14% and 15%, respectively, as compared to mode 1.

Figure 7B:
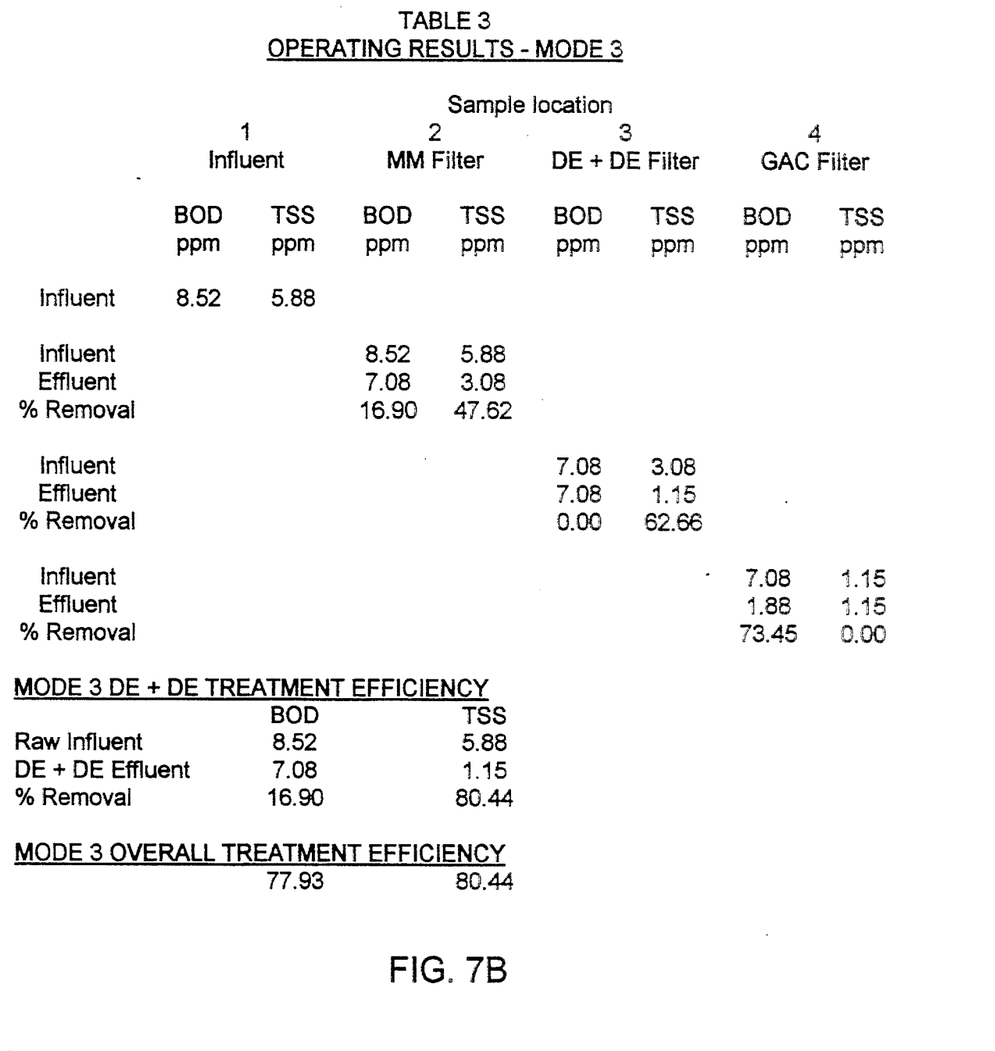

The third operating mode is shown schematically in FIG. 5. In this operating mode two DE filters in series were used. The purpose of this operating mode was to determine whether there would be any significant additional solids removed prior to the GAC filter using two DE filters. The results of this third operating mode are shown in Table 3 in FIG. 7B. TSS removal efficiency of 80.4% was demonstrated by this combination of MM+DE+DE filtration. The series operation of the two DE filters did not significantly lower the BOD applied. An average reduction of 16.9% was noted in Table 3. The overall BOD removal of 77.9% was greater than that reported in operating mode 1 (66.8%) and mode 2 (51%). The removal of 80.4% of the TSS applied in the third (MM+DE+DE) filtration, is greater than that noted in mode 1 (MM+DE), 72.3% and that of mode 2 (MM alone), 55.3%. Those results further demonstrated that effluent polishing through sequential filtration units reduces both TSS and BOD to lower levels than single units alone.

The fourth operating mode is shown schematically in FIG. 6. In this operating mode, a second GAC filter or unit was used. This fourth operating mode included the MM filter, two series DE filters and two series GAC filters. The results of this third operating mode are shown in Table 4 in FIG. 7C. BOD reductions did not improve over that of mode 3 even though two GAC filters or units were used. BOD effluent concentrations near 2 ppm appear to be refractory levels below which GAC can not go.

Figure 7C:
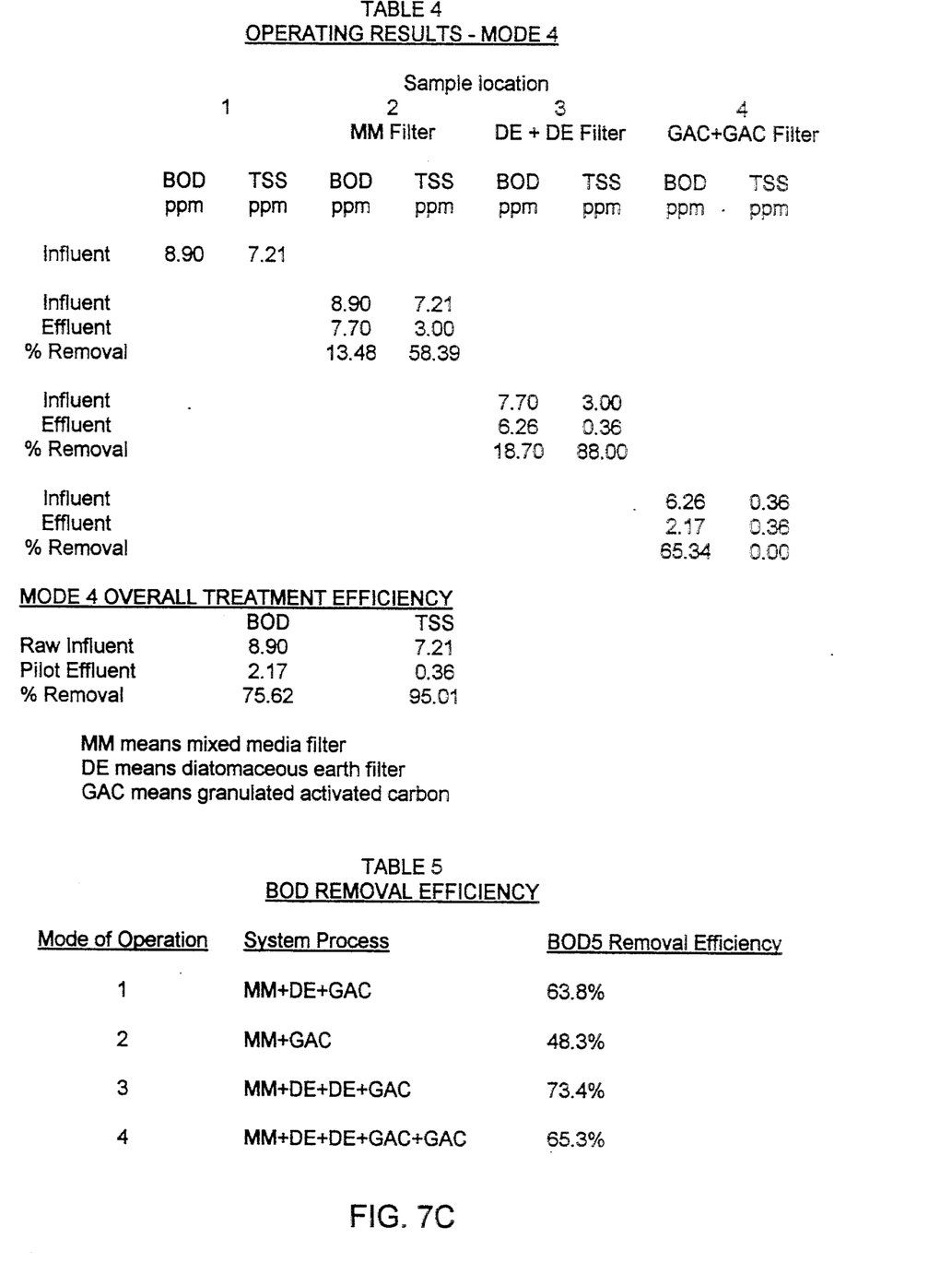

The BOD removal efficiency of all four operating modes are shown in Table 5 in FIG. 7C. Effluent polishing for TSS removal does entrance BOD removals as well, as evidenced by comparing modes 1 through 3. The elimination of DE filtration in mode 2 resulted in a deterioration of BOD removal efficiency, however the addition of a second DE filter in mode 3 increased BOD removal efficiency. These results show that increased removal of TSS via DE filtration will also remove some non-soluble BOD in the flow stream. Thus, mechanical filtration by means of MM and DE will lower both BOD and TSS levels. Those processes followed by GAC will further lower BOD levels so that regulatory permit levels are consistently met. Operation of sequential DE filtration units and sequential GAC units did not enhance the effluent to the degree that either mode would be further considered.

Thus, the three month operation demonstrated that the process of effluent polishing, i.e. MM+DE+GAC, can reduce both BOD and TSS to less than permit levels.

The second alternative embodiment of the present process (not shown in the drawings) is used for the removal of TSS, BOD and nitrogen. This embodiment is the same as that shown in FIGS. 1 and 2, except that the second adsorption unit 70 is eliminated. Accordingly, phosphorous is not removed to the level achieved by the use of a second adsorption unit 70.

The third alternative embodiment of the present invention process (not shown in the drawings) is used for the removal of TSS, BOD and phosphorous. This embodiment is the same as that shown in FIGS. 1 and 2 except that units 40, 45 and 50 are eliminated. Accordingly, nitrogen is not removed.

Having thus described the present invention with particular references to the preferred forms thereof, it will be obvious that various changes and modifications may be made therein without departing from the spirit and scope of the invention as defined by the appended claims.

What is claimed is:

1. A tertiary treatment unit for treating an influent that includes about 25 parts per million of biochemical oxygen demand, about 25 parts per million of total suspended solids, about 25 parts per million of nitrogen, and about 5 parts per million of phosphorous, said unit comprising:

a first filtration unit having a filter selected from the group consisting of mixed media, filtration sand and ion exchange compounds, said first filtration unit being effective to filter solids from said influent, whereby a first effluent results;

a second filtration unit having a filter made of diatomaceous earth along or mixed with a material selected from the group consisting of fly ash, powdered activated carbon, clay and any mixture thereof, said second filtration unit being operatively connected to said first filtration unit to receive said first effluent therefrom and to filter finer solids and bacteria and viruses from said first effluent, whereby a second effluent results;

supply means operatively connected to said second filtration unit, said supply means for providing a chemical selected from the group consisting of calcium hypochlorite, sodium hypochlorite and chlorine to be mixed into said second effluent;

an in-line mixer operatively connected to said supply means to mix said chemical into said second effluent, whereby a third effluent results;

a reactor operatively connected to said in-line mixer, for receiving said third effluent and for removing nitrogen and some phosphorous therefrom, whereby a fourth effluent results;

a first adsorption unit operatively connected to said reactor for receiving said fourth effluent and for adsorbing additional nitrogen, biochemical oxygen demand and total suspended solids and certain chemicals from said fourth effluent, said first adsorption unit having granulated activated carbon, whereby a fifth effluent results; and a second adsorption unit operatively connected to said first adsorption unit for receiving fifth effluent from said first adsorption unit and for adsorbing additional phosphorous therefrom, whereby a final effluent results, and said second adsorption unit having a medium selected from the group consisting of activated alumina and alumina;

means for connecting said first filtration unit, said second filtration unit, said in-line mixer, said reactor, said first adsorption unit, and said second adsorption unit in sequential order wherein said wastewater influent passes through said means for connecting;

further comprising a bypass provision for each of said first and second filtration units and for each of said first and second adsorption units, wherein maintenance, backwashing, recharging, and replacing are conducted for each of said units without interruption of the operation of said tertiary treatment unit;

wherein the final effluent has between about 2 and about 3 parts per million biochemical oxygen demand, about 0.1 parts per million total suspended solids, between about zero to about one part per million of nitrogen, and from about zero to about one-half of one part per million of phosphorous.

* * * * *